United States Patent
Watanabe et al.

(10) Patent No.: US 8,496,718 B2
(45) Date of Patent: Jul. 30, 2013

(54) SILICON NITRIDE CUTTING TOOL

(75) Inventors: Takashi Watanabe, Kagoshima (JP);
Tatsuyuki Nakaoka, Kagoshima (JP);
Takero Fukudome, Kagoshima (JP);
Shuichi Tateno, Kagoshima (JP);
Hiroshi Yoshimitsu, Kagoshima (JP)

(73) Assignee: Kyocera Corporation, Kyoto (JP)

( * ) Notice: Subject to any disclaimer, the term of this patent is extended or adjusted under 35 U.S.C. 154(b) by 1129 days.

(21) Appl. No.: 12/411,186

(22) Filed: Mar. 25, 2009

(65) Prior Publication Data

US 2009/0246464 A1    Oct. 1, 2009

(30) Foreign Application Priority Data

Mar. 26, 2008    (JP) .................................. 2008-080822

(51) Int. Cl.
*C09K 3/14*    (2006.01)

(52) U.S. Cl.
USPC ............. 51/309; 428/212; 428/217; 428/450; 428/698; 501/97.2; 501/97.3; 501/97.4

(58) Field of Classification Search
None
See application file for complete search history.

(56) References Cited

U.S. PATENT DOCUMENTS 4,440,547 A  *  4/1984  Sarin et al. ........................ 51/295
5,921,725 A  *  7/1999  Kashiwagi et al. ........... 407/119

FOREIGN PATENT DOCUMENTS

| JP | 04-154667 | | 5/1992 |
|---|---|---|---|
| JP | 6271357 | A | 9/1994 |
| JP | 07-309664 | | 11/1995 |
| JP | 8012441 | A | 1/1996 |
| JP | 08-073286 | | 3/1996 |
| JP | 2002-012474 | | 1/2002 |
| JP | 2002-012474 | A | 1/2002 |

OTHER PUBLICATIONS

Office Action dated Jun. 15, 2011 issued in corresponding Japanese Patent Application No. 2008-080822.

* cited by examiner

*Primary Examiner* — Jennifer McNeil
*Assistant Examiner* — Daniel J Schleis
(74) *Attorney, Agent, or Firm* — Birch, Stewart, Kolasch & Birch, LLP

(57) ABSTRACT

A silicon nitride cutting tool comprising a sintered product is disclosed. The sintered product comprises silicon nitride, at least one rare earth element compound, and a magnesium compound. The silicon nitride cutting tool further comprises a surface region and an inside region comprising the sintered product with varying content ratios of component compounds to provide enhanced wear and fracture resistance.

11 Claims, No Drawings

SILICON NITRIDE CUTTING TOOL

CROSS-REFERENCE TO RELATED APPLICATION

The present application claims priority under 35 U.S.C. §119 to Japanese Patent Application No. 2008-080822, filed on Mar. 26, 2008, entitled "SILICON NITRIDE SINTERED BODY," the content of which is incorporated by reference herein in its entirety.

FIELD OF INVENTION

The present invention generally relates to silicon nitride cutting tools, and more particularly relates to materials and composition of silicon nitride cutting tool.

BACKGROUND OF THE INVENTION

Silicon nitride based sintered products (hereinafter called silicon nitride sintered products) have high hardness and are chemically stable at high temperatures. They also have good wear resistance and good oxidation resistance. Thus, they are applicable to cutting tools.

Cutting tools must be made of a material harder than the material which is to be cut, or else the cutting tool itself would be cut. Furthermore, the tool must be able to withstand the heat and abrasive forces generated in the cutting process. Therefore, there is a need for further improvement of wear resistance and fracture resistance of silicon nitride sintered products in use as cutting tools and structural members of cutting tools.

SUMMARY

A silicon nitride cutting tool comprising a sintered product is disclosed. The sintered product comprises silicon nitride, at least one rare earth element compound, and a magnesium compound. The silicon nitride cutting tool further comprises a surface region and an inside region comprising the sintered product with varying content ratios of component compounds to provide enhanced wear and fracture resistance.

A first embodiment comprises a silicon nitride cutting tool. The silicon nitride cutting tool comprises silicon nitride, a rare earth compound comprising at least one rare earth element, and a magnesium compound comprising a magnesium element. The silicon nitride cutting tool further comprises a surface region of the sintered product, and an inside region of the sintered product. A content ratio of the at least one rare earth element in the surface region is at least about 95% of a content ratio of the at least one rare earth element in the inside region. A content ratio of the magnesium element in the surface region is less than about 95% of a content ratio of the magnesium element in the inside region.

A second embodiment comprises a silicon nitride cutting tool comprising about 94.5 to about 99.5 mass % of the silicon nitride, about 0.1 to about 4.5 mass % of at least one rare earth element oxide based on $RE_2O_3$, about 0.3 to about 2.5 mass % of magnesium oxide based on MgO, about 0 to about 0.6 mass % of aluminum oxide based on $Al_2O_3$, about 0.1 to about 4.5 mass % of oxygen based on $SiO_2$, and about 0 to about 2 mass % of a silicide of the 6th group in the Periodic Table of Elements.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the disclosure are described herein in the context of practical non-limiting applications, namely, cutting with a cutting tool. Embodiments of the disclosure, however, are not limited to such cutting applications, and the techniques described herein may also be utilized in other cutting tool applications. For example, embodiments may be applicable to grinding, sawing, or drilling with a cutting tool.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The following description is presented to enable a person of ordinary skill in the art to make and use the embodiments of the disclosure. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the embodiments of the present disclosure. Thus, the embodiments of the present disclosure are not intended to be limited to the examples described herein and shown, but are to be accorded the scope consistent with the claims.

As described herein, "inside region of the sintered product" means a substantially central region of the sintered product (body) in depth, in length and in width. Therefore, a content ratio of a substance in the inside region of the sintered product is substantially the same as the overall composition of the sintered product. The inside region of the sintered product can also be referred to as an "inside region" or an "inside of a sintered body" herein.

A surface region of the sintered product (body) can be defined as a region of the sintered product extending from the surface of the sintered product to a depth about 100 μm to about 500 μm from the surface of the sintered product. The surface region can also be defined as a whole (entire) surface region. Also, the surface region may be defined as a part of the sintered product which touches a work to be cut when the sintered product is used as a cutting tool (i.e., a cutting edge area). The surface region can be formed, for example, by a surface layer formed on an entire surface of the sintered product during sintering followed by grinding at least one part or all of the cutting edge area. A part of the cutting edge area may remain unground. Furthermore, a rake face and/or a flank face can be ground.

Silicon nitride sintered products can be improved by reforming the surface region of the sintered products. Sintering additives (e.g., aluminum) can be added to the surface region of the silicon nitride sintered products with the aim of improving the wear and fracture resistance. Sintering additives can also be served as sintering aids.

Sintering additives may be added to the surface region of the silicon nitride sintered products by several methods. Slurry containing silicon nitride powders and sintering additives can be applied to the surface of a powder compact, and then the slurry-applied powder compact is sintered. In this manner, a resultant sintered product has a higher content ratio of sintering additives in the surface region than that inside the sintered product.

Silicon nitride sintered products with a higher content ratio of sintering additives in the surface region of the sintered products compared to the inside of sintered products can be achieved by heating a sintered product at a low temperature after sintering under high pressure.

Silicon nitride sintered products having a surface region which has more oxygen and silicon than those inside of the sintered product can be obtained by heating a sintering product in a non-oxidizing atmosphere containing SiO.

Silicon nitride sintered products having a lower content ratio of yttrium and a higher content ratio of aluminum in the surface region of the sintered product than those inside the sintered product, can be realized by applying a slurry to a powder compact, sintering the slurry-applied powder compact, applying slurry to a resultant sintered product, and sintering the slurry-applied sintered product again.

A cutting tool according to one embodiment comprises silicon nitride sintered products (hereinafter, called a sintered product). The silicon nitride sintered product contains at least one rare earth (RE) compound and at least one magnesium compound. Herein, RE represents at least one element selected from yttrium and rare earth elements.

In one embodiment, a content ratio of RE element in the surface region of a sintered product is substantially the same as the content ratio of the RE element inside of the sintered product. The difference in the content ratio of RE element between the surface region of the sintered product and the inside of the sintered product is within 5% of the content ratio inside of the sintered product.

Accordingly, a content ratio of RE element in the surface region of the sintered product and a content ratio of RE element in the inside region of the sintered product is based on the following condition:

$$X(RE)_S = (1 \pm 0.05) * X(RE)_{IN},$$

where $X(RE)_S$ is the content ratio of RE element at surface region of the sintered product, and $X(RE)_{IN}$ is the content ratio of RE element inside of the sintered product. The above condition can also be expressed as:

$$0.95 * X(RE)_{IN} \leq X(RE)_S \leq 1.05 * X(RE)_{IN}$$

In one embodiment, at least one part of the surface region of the sintered product has a content ratio of the magnesium element that is smaller than the content ratio inside of the sintered product by at least 5%. In other words, the difference in the content ratio of magnesium element between the surface region of the sintered product and the inside of the sintered product is more than 5% of the content ratio inside of the sintered product.

Accordingly, content ratio of magnesium element in the surface region of the sintered product and the content ratio of magnesium element in the inside region of the sintered product is based on the following relationship:

$$X(Mg)_S < 0.95 * X(Mg)_{IN},$$

where $X(Mg)_S$ is the content ratio of magnesium element in the surface region of the sintered product or in one part of the surface region of the sintered product, and $X(Mg)_{IN}$ is the content ratio of magnesium element in the inside region of the sintered product.

In another embodiment, a content ratio of magnesium element in the surface region of the sintered product and the content ratio of magnesium element in the inside region of the sintered product is based on the following relationship:

$$0.7 * X(Mg)_{IN} < X(Mg)_S.$$

Accordingly, by combining the two above equations, the upper and lower limits of $X(Mg)_{IN}$ for $X(Mg)_S$ can be shown as follows:

$$0.7 * X(Mg)_{IN} < X(Mg)_S < 0.95 * X(Mg)_{IN}$$

In one embodiment, the electron probe micro-analysis (EPMA) may be used to determine the content ratio of the elements mentioned above. In this analysis, the content ratio of each element may be measured by EPMA surface analysis of the cross section of the sintered product with a field with 50 μm in depth and 50 μm in width at a central region of the sintered product (body) to determine the content ratio of elements inside the sintered product. In this case, this surface analysis may be performed at three fields, and the content ratio inside the sintered product can be determined by calculating an average of three values.

In one embodiment, the sintered product further comprises an aluminum compound. The content ratio of the aluminum compound in the surface region of the sintered product is within 10% of the content ratio of the aluminum compound in the inside region of the sintered product based on the following condition:

$$X(Al)_S = (1 \pm 0.10) * X(Al)_{IN},$$

where $X(Al)_S$, is a content ratio of aluminum element in the surface region of the sintered product (body), and $X(Al)_{IN}$ is a content ratio of aluminum element in the inside region of the sintered product (body).

The above condition can also be expressed as:

$$0.9 * X(Al)_{IN} \leq X(Al)_S \leq 1.10 * X(Al)_{IN}$$

In one embodiment, the sintered product (body) further comprises oxygen. A difference in oxygen content between the surface region of the sintered product and the inside region of the sintered product is 15% or less based on the following condition:

$$X(O)_S = (1 \pm 0.15) * X(O)_{IN}$$

where $X(O)_S$ is the oxygen content in the surface region of the sintered product, and $X(O)_{IN}$ is the oxygen content in the inside region of the sintered product (body).

The above condition can also be expressed as:

$$0.85 * X(O)_{IN} \leq X(O)_S \leq 1.15 * X(O)_{IN}.$$

In one embodiment, a composition of the sintering product comprises, without limitation, about 94.5 to about 99.5 mass % of silicon nitride, about 0.1 to about 4.5 mass % of rare earth element oxide ($RE_2O_3$), about 0.3 to about 2.5 mass % of magnesium oxide (MgO), about 0 to about 0.6 mass % of aluminum oxide ($Al_2O_3$), about 0.1 to about 4.5 mass % of excess oxygen based on silica ($SiO_2$), and about 0 to about 2 mass % of silicide of the 6th group in the Periodic Table of Elements. $RE_2O_3$ refers to any rare earth element in such a combination with oxygen such as, for example, $La_2O_3$.

The above composition of the sintering product increases the hardness and strength of a sintered product at an elevated temperature, and accordingly improves the abrasion resistance of the sintered product.

In one embodiment, the sintered product comprises RE compounds, magnesium compounds, and aluminum compounds in a form of their respective oxides. The oxides can increase the bonding strength among silicon nitride particles and increase the content of silicon nitride in the sintered product.

In one embodiment, the sintered product comprises about 0.5 to about 4.5 mass % of rare earth oxide ($RE_2O_3$), more particularly about 1 to about 2.5 mass % for better densification.

In one embodiment, the sintered product comprises about 0.35 to about 2.0 mass % of magnesium oxide (MgO), more particularly about 0.4 to about 1.0 mass % for lowering the temperature necessary to generate a liquid phase for the sintering aids.

In one embodiment, the sintered product further comprises about 0.2 to about 0.55 mass % of an aluminum oxide (Al2O3), more particularly about 0.3 to about 0.5 mass % for lowering the temperature necessary to generate a liquid phase for the sintering aids, for obtaining better densification and for minimizing the degradation of wear resistance due to the degradation of oxide resistance.

Excess oxygen atoms which do not make compounds with rare earth atoms, magnesium atoms and/or aluminum atoms may become impurities in the silicon nitride sintered product in a form of silica ($SiO_2$). Excess oxygen may be added in order to lower the temperature to generate a liquid phase for the sintering aids, and thereby have better densification and improved oxide resistance resulting in better wear resistance. For an example, the sintered product may contain about 0.1 to about 4.5 mass % of excess oxygen based on $SiO_2$. For another example, the sintered product may contain about 1.0 to about 2.5 mass % of excess oxygen based on $SiO_2$. For yet another example, the sintered product may contain about 1.5 to about 2 mass % of excess oxygen based on $SiO_2$.

A sintered product containing Lanthanum (La) as a rare earth element tends to have higher density than a sintered product not containing Lanthanum when sintered at a low temperature. That is, Lanthanum reduces abnormal grain growth in the sintered product. Accordingly, a small particle size of silicon nitride crystals in the sintered product can be more easily maintained. For example, a sintered product having more than 99% of relative density, and obtained by sintering at about 1730° C. to about 1780° C. under normal pressure may have an average maximum grain size of about 10 µm or less. The average maximum grain size may be calculated as an average length from six values of the largest grain length to sixth largest grain length in a view of 0.015 $mm^2$ observed by Secondary Electron Microscopy (SEM). As a result, the hardness and strength of the sintered product can be improved.

Rare earth (RE) atoms, magnesium (Mg) atoms, aluminum (Al) atoms, and/or silicon (Si) atoms may form a grain boundary phase. A part of the grain boundary phase can contain crystals deposited on grain boundaries. On the other hand, the sintered product may contain less grain boundary phase, for example about 4 mass % or less so as to improve the hardness and strength at an elevated temperature of the sintered product. In this case, the grain boundary phase may be amorphous in order to improve the bond strength between silicon nitride crystals.

In one embodiment, although a sintered product may comprise silicon nitride crystals as a main crystal therein, the sintered product may also comprise crystals such as, without limitation, β-silicon nitride crystals, β-sialon crystals (which comprises silicon nitride and aluminum), and α-silicon nitride crystals. A sintered product with fewer α-silicon nitride crystals can achieve higher hardness and higher strength. Silicides of the 6th group elements in the Periodic Table of Elements can make the sintered product appear black in color as well as make the strength high at an elevated temperature. The silicides of the 6th group elements may comprise, without limitation, chromium silicide, molybdenum silicide, and tungsten silicide. Fine tungsten silicide grains may remain in a sintered product when fine powder of tungsten oxide is used. These silicides may be dispersed in the grain boundaries of the sintered product.

To produce a sintered product according to an embodiment of the disclosure, silicon nitride ($Si_3N_4$) powders, hydroxide ($RE(OH)_2$) powders of RE element or an oxide ($RE_2O_3$) powders of RE element, an aluminum oxide ($Al_2O_3$) powders, and magnesium hydroxide ($Mg(OH)_2$) powders are provided as a starting materials. In addition, silicon dioxide ($SiO_2$) powders and silicide powders of the 6th group element in the periodic table can also be provided if needed to achieve a required performance such as improvement of wear and fracture resistance. $RE(OH)_2$ refers to any rare earth element (RE) in such a combination with hydroxide such as, for example, $La(OH)_2$.

Silicon nitride powders may be, without limitation, a-$Si_3N_4$ powders, b-$Si_3N_4$ powders, or the mixture thereof. The average particle size of the silicon nitride powders may be about 1 µm or less, more particularly, about 0.5 µm or less. Silicon nitride powders generally contain an oxide therein as silicon oxide as an unavoidable component. Consequently, oxide used in the silicon nitride powders may be silica ($SiO_2$) so that the composition is adjusted. For example, if more oxygen is needed, silica powders can be added to the starting materials.

Raw materials for the rare earth (RE) element source may be, without limitation, oxide powders. Since Lanthanum oxide ($La_2O_3$) is highly hygroscopic, Lanthanum compounds having low hygroscopic and easily turned into Lanthanum oxide ($La_2O_3$) during sintering process such as Lanthanum hydroxide ($La(OH)_2$) may be preferably used.

Raw materials for magnesium source may be, without limitation, magnesium oxide (MgO) powders or magnesium carbonate ($MgCO_3$) powders. Since magnesium oxide (MgO) has high water absorbability and magnesium carbonate releases carbon dioxide gas, magnesium (Mg) compounds such as magnesium hydroxide ($Mg(OH)_2$) having low water absorbability, releasing no gas, and easily turned into magnesium oxide (MgO) during sintering process may be preferably used.

Raw materials for the 6th group element in the Periodic Table of Elements may comprise, without limitation, oxides, carbides, silicides, nitrides, or mixture thereof, and the like. From a cost point of view, or from a manufacturing point of view to obtain fine powers, oxide may be chosen.

Subsequently, the foregoing powders are measured and mixed. Accordingly, binders and solvents may be added to the mixture of powders, mixed, pulverized, dried and granulated. Then, the granulated powders are molded into powder compacts with desired shapes by a known molding method. The powder compacts are then fired at about 1650° C. to about 1800° C. in nitrogen by, without limitation, using a normal pressure sintering method, a gas pressure sintering method, a hot pressing method, and the like.

More specifically, in the foregoing sintering process, the powder compacts are set in a firing pot made of silicon nitride sintered product (body) with Si and Mg sources so as to have Si vapor and Mg vapor during sintering. For example, compounds including, without limitation. Si and/or Mg element(s) such as silicon powders, silica powders, silicon nitride powders, magnesium oxide powders, magnesium hydroxide, and the like. Alternatively, a sintering pod may have an inner wall where Si and/or Mg containing material is infiltrated. Alternatively, the inner wall of the sintering pod may be coated with Si and/or Mg sources such as glasses including Si element and/or Mg element. The additional powders may be set around the powder compacts, the powder compacts are set on a bed of the additional powder bed, or the powder compacts are buried in the additional powders. The additional powders provide SiO gas and MgO gas inside the furnace so that the sintering of the powder compacts is enhanced. The lid of the pot is closed without a complete seal, and the pot is set in a firing furnace. The air in the furnace is replaced by nitrogen at about 1 atm (atmosphere) followed by rising the temperature thereof at the heating rate of about 5° C./min to about 15° C./min. The heating rate is changed to about 1° C./min to about 5° C./min between about 1400° C. and about 1500° C. The heating rate is then changed again to about 5° C./min to about 15° C./min between 1500° C. and the sintering temperature. The temperature is kept at about 1650° C. to about 1800° C. as a sintering temperature for about 5 hours to about 10 hours. After the sintering at the sintering temperature, the furnace is cooled down to about 1100° C. at the cooling rate of about 10° C./min to about 50° C./min followed by cooling down to room temperature. During firing, the pressure in the furnace can be maintained at about 1 atm filled by adding nitrogen or ejecting excess nitrogen to outside. As a result, magnesium tends to evaporate at the surface region of a sintered product during sintering process while rare earth element tends not to evaporate at the surface region of the sintered product during sintering. Then, a densified sintered product with low content ratio of magnesium element in the surface region and with the same content ratio of rare earth element as that inside thereof can be obtained.

In another embodiment, the different pressures for sintering may be applied within the scope of the invention. That is, one can sinter the powder compacts at a pressure higher than 1 atm as well as under a reduced pressure. One may sinter powder compacts, for example, in nitrogen at a pressure of 4 atm.

The above heating rate between about 1400° C. and about 1500° C., and the cooling rate between the sintering temperature and about 1100° C. contribute to the uniform temperature throughout the powder compact at the temperature range in which all elements start diffusion. A sintered product with the desired composition in the surface region of the sintered product is thereby obtained.

Hot isostatic pressing (HIP) may be applied to a sintered product (body) sintered at the temperature of about 1650° C. to about 1800° C. Furthermore, HIP may be performed at the temperature of about 1500° C. to about 1700° C. and under the pressure of about 9.8 MPa to about 294 MPa. In this manner, HIP results in denser sintered products with less abnormal grain growth of silicon nitride crystals, thereby improved chipping resistance.

In addition, a grinding process may be applied to the above foregoing sintered product for a desired purpose as long as the sintered product comprises a surface region on the surface thereof.

The sintered product according to various embodiments of the disclosure can be preferably used as structural members, especially as a cutting tool where high wear resistance and high chipping resistance may be required.

The sintered product may comprise one or more hard coating layers such as, without limitation, titanium nitride (TiN), aluminum oxide ($Al_2O_3$) or titanium aluminum nitride (TiAlN), and the like. The coating can be performed with reference to U.S. patent application Ser. Nos. 10/780,527 or 11/998,058 contents of applicable parts of which are incorporate by reference herein.

As mentioned above, according to the silicon nitride type sintered product (body) of the present disclosure, a content ratio of an RE element in an inside region of the sintered product (body) and content ratio of the RE element in the surface region of the sintered product (body) may be approximately the same.

When an area of the surface region of the sintered product (body) has a lower content ratio of magnesium than the inside region of the sintered product (body), the defect resistance in the surface region of the sintered product (body) can increase hardness in the surface region of the sintered product (body).

An exemplary table 1 shows conditions for manufacturing the sintered product according to various embodiments of the disclosure. The table 1 includes Sample Numbers, additives in sintering pod, heating rate in the ranges between 1400 and 1500° C. and above 1500° C., sintering condition, and cooling rate.

Based on the compositions shown in Table 2 below, a mixture was obtained by mixing silicon nitride ($Si_3N_4$) powder having an average particle diameter of about 0.3 μm, rare earth (RE) compounds having an average particle diameter of about 1.2 μm such as Lanthanum hydroxide ($La(OH)_2$) (not shown in Table 2), yttrium oxide ($Y_2O_3$), ytterbium oxide ($Yb_2O_3$), erbium oxide ($Er_2O_3$) or cerium oxide ($Ce_2O_3$), aluminum oxide ($Al_2O_3$) powder having an average particle diameter of 0.7 μm, and magnesium hydroxide ($Mg(OH)_2$) (not shown in Table 2), powder having an average particle diameter of 2.5 μm.

A binder and a solvent were added to the above material powders (Table 2). The resulting mixture was pulverized and blended with an attritor mill for about 72 hours and dried to remove the solvent to afford a granulated powder. An attritor mill is a high-energy stirred-ball mill used for mechanically alloying metal powder particles. The granulated powder was molded into powder compacts, each having a cutting-tool shape of SNGN 120412 by pressing at 98 MPa.

The powder compacts were placed in a sintering pod with a mixture of at least one selected from $Si_3N_4$ powders, Si powders and $SiO_2$ powders, and $Mg(OH)_2$ powders. The lid was closed with the mixture described above (Table 2). The sintering pod was placed in a cylindrical carbon case, and set in a firing furnace.

The air in the furnace was substituted by nitrogen under atmospheric pressure (at an absolute pressure of 1 atm). After calcination, the powder compacts in the furnace were heated up to 1400° C. at a heating rate of about 10° C./minute followed by heating up to each sintering temperature at heating rates shown in Table 1. Subsequently, sintered products (bodies) were subjected to HIP at a temperature of about 1600° C. and pressure of about 196 MPa for about 2 hours. Then, the obtained sintered products were subjected to a grinding process (a double-edge process and an outer circumferential process) to cut the surface region of the sintered product by about 0.3 mm in depth.

TABLE 1

| Sample No. | Additives in Sintering Pod | Heating Rate (° C./min) 1400 to 1500° C. | Heating Rate (° C./min) above 1500° C. | Sintering Condition Temperature (° C.) | Sintering Condition Time (hour) | Cooling rate (° C./min) |
|---|---|---|---|---|---|---|
| 1 | filled inside of the pod | 2 | 10 | 1780 | 6 | 20 |
| 2 | filled inside of the pod | 4 | 8 | 1800 | 5 | 25 |
| 3 | filled inside of the pod | 2 | 10 | 1810 | 6 | 15 |
| 4 | applied on the inner surface of the pod | 6 | 10 | 1770 | 8 | 10 |
| 5 | applied on the surface of powder compacts to be sintering products after sintering | 5 | 8 | 1790 | 6 | 20 |
| 6 | put a pile of powders at circumference of the pod | 3 | 8 | 1760 | 10 | 15 |
| 7 | made a powder bed | 3 | 10 | 1820 | 8 | 30 |
| 8 | made a powder bed | 4 | 10 | 1820 | 7 | 15 |
| 9 | put a pile of powders at circumference of the pod | 5 | 8 | 1780 | 5 | 10 |
| 10 | filled inside of the pod | 10 | 10 | 1780 | 6 | 10 |
| 11 | no mixing powder | 2 | 10 | 1820 | 6 | 20 |
| 12 | put a pile of powders at circumference of the pod | 3 | 10 | 1850 | 7 | 25 |
| 13 | filled inside of the pod | 5 | 10 | 1780 | 6 | 5 |

Table 2 shows data for overall (inside region) composition and the surface composition of the sintered product manufactured according to various embodiments of the disclosure under the conditions shown in Table 1, measured by the ICP analysis. The Table 2 shows Sample Numbers, overall composition of sintered product, composition at the surface (surface region of the sintered product), ratio (%) (surface/overall), and thickness of surface region (surface region of the sintered product).

The center region (inside region) of the sintered product was used as the region of the sintered product for measuring overall composition. The EPMA surface analysis including mapping was performed at three areas of about 50 μm by about 50 μm at the center region and the average composition for the data was calculated and used to represent the inside composition. The composition ratio (content ratio) of the surface composition to the inside composition (surface composition/inside composition, or surface composition/overall composition) was calculated. The results are presented in Table 2 (ratio (%) (surface/overall)).

The thickness of the surface region (surface region of the sintered product) is determined as follows: first, cross sectional surface was prepared. The surface region of the sintered product was measured by electron probe micro-analyzer (EPMA) to obtain color mapping data of each element as surface distribution data. The surface region of the sintered product is regarded as the region to a depth at which the composition change appears.

The amount of oxygen in each of the sintered products was measured by the following method. First, the surface region of each sintered product was subjected to grinding to remove some of the depth of the surface region. The powders ground were collected to make a specimen for measurement of an amount of oxygen in the surface region of the sintered product. Next, the center region (inside region) of the sintered products was subject to a grinding to remove 3 mm (in thickness). The powders from grinding were collected to make a specimen for measurement of an amount of oxygen in the inside region. The amount of oxygen was measured by infrared absorption spectrometry with those collected powders. The content ratio of an amount of oxygen in the surface region of the sintered product to that in the center region of the sintered product was calculated. The results are presented in Table 2 (ratio (%) (surface/overall)).

TABLE 2

| Sample No. | Overall Composition of Sintered Product (mass %) $Si_3N_4$ | $RE_2O_3$ | MgO | $Al_2O_3$ | Oxygen | Silicide of 6th group | Composition at the Surface (mass %) $RE_2O_3$ | MgO | $Al_2O_3$ | Oxygen | Ratio (%) (Surface/Overall) $RE_2O_3$ | MgO | $Al_2O_3$ | Oxygen | Thickness of Surface Region (μm) |
|---|---|---|---|---|---|---|---|---|---|---|---|---|---|---|---|
| 1 | the rest | $La_2O_3$ 1.00 | 0.50 | 0.40 | 1.73 | — | 1.00 | 0.36 | 0.40 | 1.65 | 100 | 71 | 100 | 95 | 50 |
| 2 | the rest | $La_2O_3$ 1.51 | 0.70 | 0.32 | 1.85 | $W_2S$ 0.50 | 1.53 | 0.47 | 0.33 | 1.70 | 101 | 67 | 104 | 92 | 100 |
| 3 | the rest | $Y_2O_3$ 1.51 | 0.80 | 0.32 | 1.89 | — | 1.46 | 0.52 | 0.31 | 1.66 | 97 | 65 | 97 | 88 | 150 |
| 4 | the rest | $Yb_2O_3$ 1.65 | 0.50 | 0.35 | 1.81 | $W_2S$ 0.30 | 1.70 | 0.43 | 0.33 | 1.88 | 103 | 85 | 94 | 104 | 40 |
| 5 | the rest | $Er_2O_3$ 1.40 | 1.30 | 0.32 | 2.07 | — | 1.37 | 0.95 | 0.34 | 2.09 | 98 | 73 | 106 | 101 | 80 |
| 6 | the rest | $Ce_2O_3$ 1.65 | 0.80 | 0.35 | 1.93 | $W_2S$ 0.70 | 1.68 | 0.63 | 0.32 | 1.71 | 102 | 79 | 91 | 89 | 30 |
| 7 | the rest | $La_2O_3$ 2.50 | 0.50 | 0.40 | 1.96 | — | 2.60 | 0.31 | 0.44 | 2.07 | 104 | 62 | 110 | 106 | 250 |
| 8 | the rest | $La_2O_3$ 1.50 | 0.50 | 0.05 | 1.64 | $W_2S$ 1.00 | 1.44 | 0.40 | 0.04 | 1.41 | 96 | 79 | 88 | 86 | 200 |

TABLE 2-continued

| Sample No. | Overall Composition of Sintered Product (mass %) | | | | | | Composition at the Surface (mass %) | | | | Ratio (%) (Surface/Overall) | | | | Thickness of Surface Region (μm) |
|---|---|---|---|---|---|---|---|---|---|---|---|---|---|---|---|
| | $Si_3N_4$ | $RE_2O_3$ | MgO | $Al_2O_3$ | Oxygen | Silicide of 6th group | $RE_2O_3$ | MgO | $Al_2O_3$ | Oxygen | $RE_2O_3$ | MgO | $Al_2O_3$ | Oxygen | |
| 9 | the rest | $Y_2O_3$ | 1.50 | 0.50 | 0.50 | 1.85 | — | 1.53 | 0.43 | 0.56 | 2.04 | 102 | 85 | 112 | 110 | 110 |
| 10 | the rest | $Y_2O_3$ | 1.76 | 1.20 | 0.42 | 2.13 | — | 1.74 | 1.18 | 0.44 | 1.94 | 99 | 98 | 105 | 91 | — |
| 11 | the rest | $La_2O_3$ | 1.70 | 1.50 | 0.33 | 2.20 | — | 1.53 | 0.78 | 0.28 | 1.78 | 90 | 52 | 84 | 81 | 70 |
| 12 | the rest | $Y_2O_3$ | 1.67 | 0.30 | 0.33 | 1.72 | — | 1.30 | 0.12 | 0.27 | 1.24 | 78 | 41 | 81 | 72 | 210 |
| 13 | the rest | $La_2O_3$ | 1.51 | 0.70 | 0.32 | 1.85 | — | 1.52 | 0.69 | 0.36 | 1.94 | 101 | 99 | 113 | 105 | — |

Table 3 shows results of cutting tests of the manufactured silicon nitride cutting tools, measured by the ICP analysis, according to various embodiments of the disclosure for the overall composition (inside region) and the composition at the surface (surface region of the sintered product) shown in Table 2. The Table 3 shows Sample Numbers, Flank wear, and chipping area.

The cutting test of the obtained silicon nitride cutting tools was conducted under the following conditions: work material: FCD-450 block, cutting speed: 500 m/min, feed rate: 0.2 mm/rev, cutting depth: 2.0 mm, and cutting condition: dry cutting. The evaluation method was as follows: the cutting edge was observed with a microscope, and an amount of the flank wear and the presence of chipping were measured after 10 passes of cutting.

TABLE 3

| Sample No. | Frank Wear (μm) | Chipping Ares ($mm^2$) | Remarks |
|---|---|---|---|
| 1 | 180 | 0.04 | |
| 2 | 190 | 0.06 | |
| 3 | 195 | 0.08 | |
| 4 | 210 | 0.06 | |
| 5 | 200 | 0.06 | |
| 6 | 235 | 0.07 | |
| 7 | 220 | 0.08 | |
| 8 | 230 | 0.09 | |
| 9 | 250 | 0.10 | |
| 10 | 300 | 0.10 | wear is large |
| 11 | 440 | 0.10 | abnormal wear |
| 12 | 430 | 0.24 | abnormal wear |
| 13 | 450 | 0.25 | wear is large |

As shown in Tables 1 to 3, Sample Nos. 1 to 9 demonstrated cutting performance with a small amount of Flank wear (e.g., less than or equal to 250 μm) and a slight chipping area (e.g., less than or equal to 0.1 $mm^2$) of the cutting edge.

In contrast, each of Sample No. 10 and Sample No. 13 demonstrated cutting performance with poor wear resistance (e.g., large Flank wear). Sample No. 10 was made at a heating rate greater than 5° C./min between 1400° C. and 1500° C. as shown in Table 1. Sample No. 13 was made at a cooling rate than 1° C./min between sintering temperature and 1100° C. as shown in Table 1. As shown in Table 3, a Flank wear of 300 μm and 450 μm was demonstrated for Sample Nos. 10 and 13 respectively.

In addition, Sample No. 11 and Sample No. 12 demonstrated cutting performance with poor chipping resistance (chipping area shows abnormal wear). Sample No. 11 was made without the additional powders (as shown in Table 1, no mixing powders) such as Si and Mg inside the sintering pod. Sample No. 12 was sintered at the temperature higher than 1800° C. as shown Table 1. As shown in Table 3, Sample Nos. 11 and 12 demonstrated chipping area of 0.1 $mm^2$, and 0.24 $mm^2$ respectively.

In this way, the silicon nitride cutting tool made by the material and compositions according to the various embodiments of the disclosure performs with improved wear and fracture resistance.

Although exemplary embodiments of the present disclosure have been described above with reference to the accompanying Tables, it is understood that the present disclosure is not limited to the above-described embodiments. Various alterations and modifications to the above embodiments are contemplated to be within the scope of the disclosure. It should be understood that those alterations and modifications are included in the technical scope of the present disclosure as defined by the appended claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying Tables, it is to be noted that changes and modifications may be apparent to those skilled in the art. Such changes and modifications are to be understood as being included within the scope of the present disclosure as defined by the claims.

What is claimed is:

1. A silicon nitride cutting tool comprising:
    a sintered product comprising silicon nitride, a rare earth compound containing at least one rare earth element, and a compound comprising magnesium;
    a surface region of the sintered product; and
    an inside region of the sintered product;
    wherein the ratio of the content of the at least one rare earth element in the surface region to the content of the at least one rare earth element in the inside region is at least about 95%, and the ratio of the content of the magnesium in the surface region to the content of the magnesium in the inside region is less than about 95%; and
    wherein the sintered product further comprises oxygen, wherein the ratio of the content of the oxygen in the surface region to the content of the oxygen in the inside region is at least about 85%.

2. The silicon nitride cutting tool according to claim 1, wherein the sintered product further comprises a compound comprising aluminum.

3. The silicon nitride cutting tool according to claim 2, wherein ratio of the content of aluminum in the surface region is at least about 90% of the content of the aluminum in the inside region.

4. The silicon nitride cutting tool according to claim 1, wherein the sintered product comprises:
    about 94.5 to about 99.5 mass % of the silicon nitride;
    about 0.1 to about 4.5 mass % of at least one rare earth element oxide based on $RE_2O_3$;
    about 0.3 to about 2.5 mass % of magnesium oxide based on MgO;
    about 0 to about 0.6 mass % of aluminum oxide based on $Al_2O_3$;
    about 0.1 to about 4.5 mass % of excess oxygen based on $SiO_2$; and
    about 0 to about 2 mass % of a silicide of the 6th group in the Periodic Table of Elements.

5. The silicon nitride cutting tool according to claim 1, wherein the at least one rare earth element comprises Lanthanum.

6. The silicon nitride cutting tool according to claim 1, wherein the surface region of the sintered product comprises about 0.1 to about 1.0 mass % of the magnesium oxide based on MgO.

7. The silicon nitride cutting tool according to claim 1, further comprising at least one hard coating layer on the sintered product.

8. The silicon nitride cutting tool according to claim 7, wherein the at least one hard coating layer comprises aluminum.

9. The silicon nitride cutting tool according to claim 1, wherein the surface region extends from a surface of the sintered product to a depth about 100 μm to about 500 μm from the surface of the sintered product.

10. The silicon nitride cutting tool according to claim 1, wherein the ratio of the content of magnesium in the surface region is at least about 70% of the content of magnesium in the inside region.

11. The silicon nitride cutting tool according to claim 1, wherein the ratio of the content of the rare earth element in the surface region is at most about 105% of the content of the rare earth element in the inside region.

* * * * *